US010146495B2

(12) United States Patent
Nizzoli

(10) Patent No.: US 10,146,495 B2
(45) Date of Patent: Dec. 4, 2018

(54) INVENTORY MANAGEMENT SYSTEM

(71) Applicant: Curt A Nizzoli, Port Orchard, WA (US)

(72) Inventor: Curt A Nizzoli, Port Orchard, WA (US)

(*) Notice: Subject to any disclaimer, the term of this patent is extended or adjusted under 35 U.S.C. 154(b) by 2 days.

(21) Appl. No.: 15/387,455

(22) Filed: Dec. 21, 2016

(65) Prior Publication Data

US 2018/0173487 A1 Jun. 21, 2018

(51) Int. Cl.
*G06F 3/14* (2006.01)
*A47F 3/04* (2006.01)
*A47F 11/10* (2006.01)
*G06Q 10/08* (2012.01)
*A47B 73/00* (2006.01)
*A47F 10/02* (2006.01)

(52) U.S. Cl.
CPC .......... *G06F 3/1454* (2013.01); *A47F 3/0434* (2013.01); *A47F 11/10* (2013.01); *G06Q 10/087* (2013.01); *A47B 73/00* (2013.01); *A47F 2010/025* (2013.01); *G05B 2219/50333* (2013.01)

(58) Field of Classification Search
CPC ...... G06F 3/1454; G06F 3/044; G06F 3/0484; G06F 3/0488; G06F 3/0421; G06F 3/04817; G06F 3/01; G09G 5/12; A47B 73/00
USPC .......................................................... 345/173
See application file for complete search history.

(56) References Cited

U.S. PATENT DOCUMENTS

| | | |
|---|---|---|
| 2007/0162357 A1 | 7/2007 | Banerjee et al. |
| 2007/0214055 A1 | 9/2007 | Temko |
| 2011/0221776 A1* | 9/2011 | Shimotani ............ G06F 3/0421 345/647 |
| 2012/0080445 A1 | 4/2012 | Moezidis et al. |
| 2012/0211516 A1 | 8/2012 | Zapp et al. |
| 2013/0211928 A1 | 8/2013 | De Benito Secades et al. |
| 2013/0245819 A1 | 9/2013 | Davenport et al. |
| 2013/0257713 A1* | 10/2013 | Yamada ................... G06F 3/01 345/156 |
| 2014/0125599 A1 | 5/2014 | Seeley |

(Continued)

FOREIGN PATENT DOCUMENTS

WO WO2016/141322 A1 9/2016
WO PCT/US17/066457 2/2018

*Primary Examiner* — Fred Tzeng
(74) *Attorney, Agent, or Firm* — FisherBroyles LLP; Kevin D. Jablonski

(57) ABSTRACT

An inventory management system suited to provide inventory information for items in the inventory based upon a position in the system. In an embodiment, the inventory being kept track of is a wine collection and the system for managing the inventory may be a wine refrigerator with several storage positions in a refrigerated cavity accessible by a door. The door may be a clear panel having functionality to detect a tactile input on the panel as well as configured to display information about one or more inventory items in response to the tactile input. Thus, as a person may touch a particular portion of the panel, the panel senses the touch and then triggers display of specific information about the particular wine that is closest to where the touch was detected. That is, a person may touch the panel on the closed door near a bottle of wine to trigger a display of the corresponding bottle of wine.

19 Claims, 5 Drawing Sheets

(56) References Cited

U.S. PATENT DOCUMENTS

| | | | | |
|---|---|---|---|---|
| 2015/0186101 A1* | 7/2015 | Zhang | ................... | G06F 3/0488 |
| | | | | 345/173 |
| 2015/0378664 A1* | 12/2015 | Colmagro | ............. | G06F 3/1454 |
| | | | | 455/557 |
| 2015/0379963 A1* | 12/2015 | Holmanu | ................. | G09G 5/12 |
| | | | | 345/173 |
| 2016/0320937 A1* | 11/2016 | Zhou | ..................... | G06F 3/0484 |
| 2017/0038904 A1* | 2/2017 | Murata | ................. | G06F 3/0421 |
| 2017/0038946 A1* | 2/2017 | Deng | ................. | G06F 3/04817 |

* cited by examiner

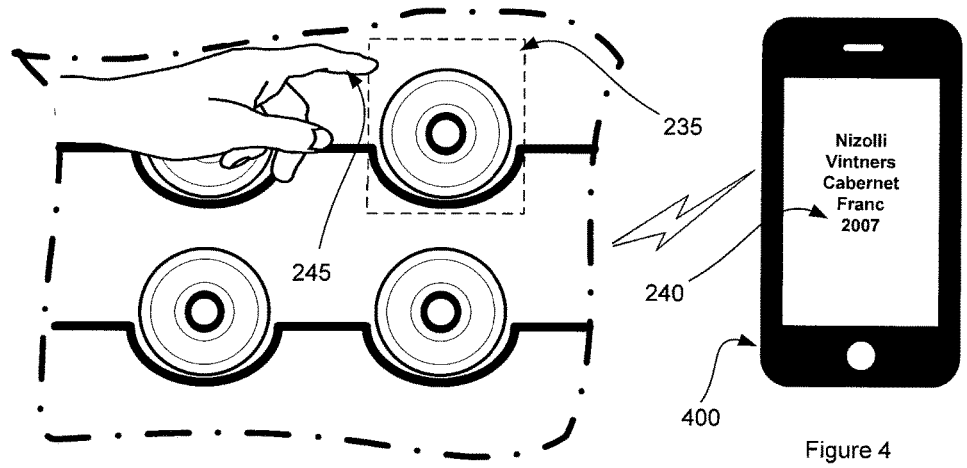
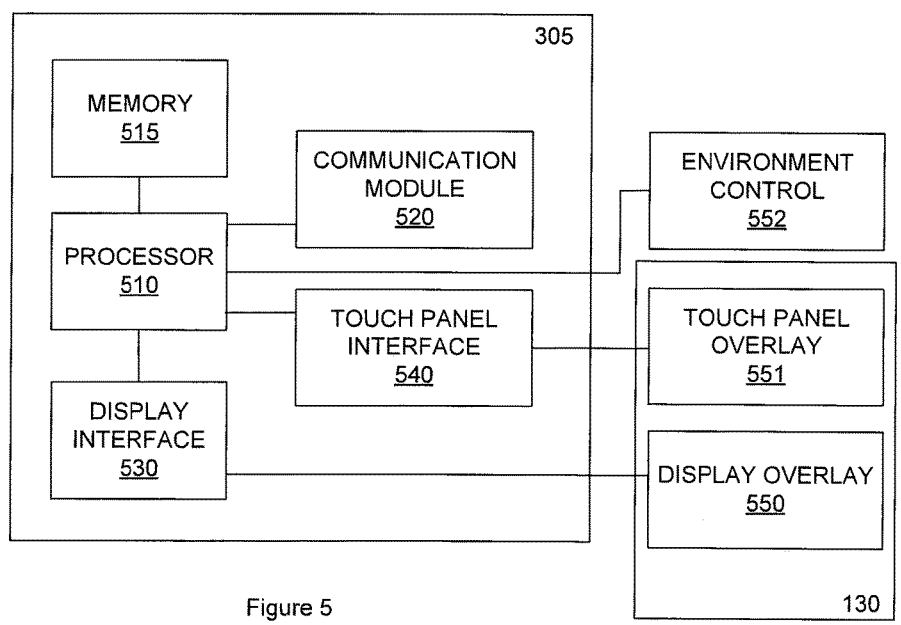
Figure 5

INVENTORY MANAGEMENT SYSTEM

BACKGROUND

Some collections of items, such as a collection of wine, are often best stored in controlled environments that carefully regulate ambient conditions such as temperature and humidity. This is to ensure that the contents of the collection are preserved for use at some later point in time. Further, such collections may be best stored in manner that does not allow easy review of label information that may identify individual items in the collections. That is, wine bottles are best stored lying down in a rack system. Thus, for an individual to check the label information (e.g., identify the wine), the individual typically will lift the wine bottle, remove it from the rack, and check the label. This is time consuming as the individual may need to check several different bottles until a specific bottle is located.

Touching and moving the bottles of wine just to find a specific one becomes exacerbated as the collection of wine becomes larger and larger. Furthermore, if the wine bottles are stored in a controlled environment, such as a wine refrigerator, a door may be typically open while the individual attempts to locate the desired bottle. This leads to inefficiencies in controlling and maintaining the storage environment. When an individual is unable to quickly identify the storage location of a specific item in a collection of items with similar profiles and appearances, time and effort are wasted looking for the specific item.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

FIG. 4 is a system for managing inventory showing the storage appliance of FIG. 1 communicatively coupled to a smart device according to an embodiment of the subject matter disclosed herein.

FIG. 5 is a block diagram of a system for managing inventory according to an embodiment of the subject matter disclosed herein.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to an inventory management system suited to provide inventory information for items in the inventory based upon a position in the system. In an embodiment, the inventory being kept track of is a wine collection and the system for managing the inventory may be a wine refrigerator with several storage positions in a refrigerated cavity accessible by a door. The door may be a clear panel having functionality to detect a tactile input on the panel as well as configured to display information about one or more inventory items in response to the tactile input. Thus, as a person may touch a particular portion of the panel, the panel senses the touch and then triggers display of specific information about the particular wine that is closest to where the touch was detected. That is, a person may touch the panel on the closed door near a bottle of wine to trigger a display of the corresponding bottle of wine.

Such a system is advantageous as a person may quickly and easily identify what bottles of wine are stored in what positions simply by touching the panel of the door corresponding to a wine bottle position within the storage appliance. This prevents a user form having to search for a bottle of wine while the appliance door is open. A further advantage exists when a linked application executing of a mobile computing device is used whereby a user may have a stored inventory of wine already (in the memory of the mobile computing device) and then initiate a reverse lookup that will "light up" the space where a desired bottle of wine is being stored. These and other advantages are more readily understood and appreciated in the following discussion of FIGS. 1-7 below.

Figure 1:
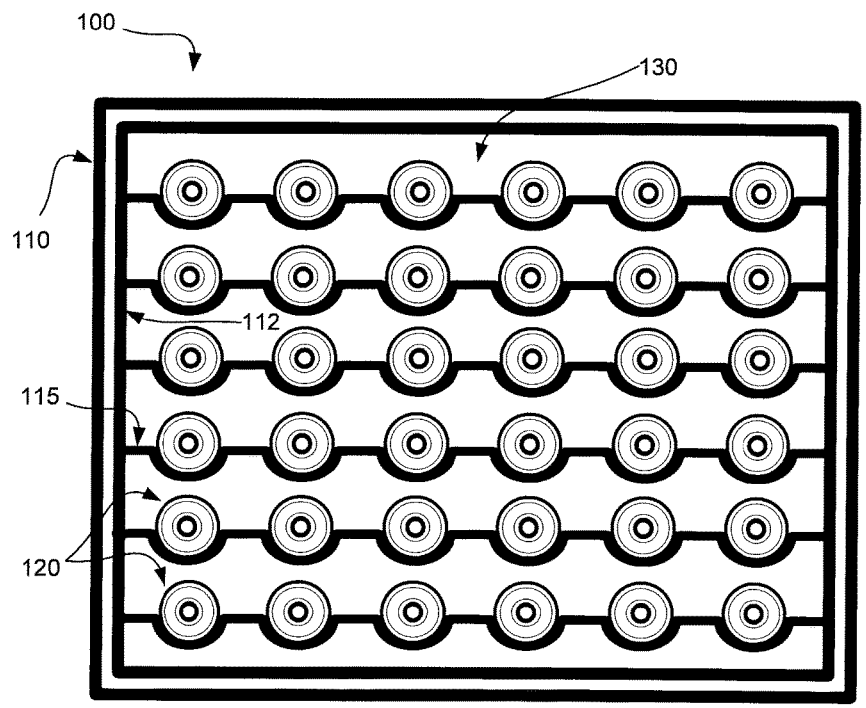
FIG. 1 is a diagram of a front of a storage appliance for an inventory showing several bottles of wine stored therein according to an embodiment of the subject matter disclosed herein.

FIG. 1 is a diagram showing a front of a storage appliance 100 for an inventory management system having several bottles of wine 120 stored therein according to an embodiment of the subject matter disclosed herein. This view of the storage appliance 100 is from a front view where a front panel 130 may be transparent or translucent so that one may see into a storage cavity enclosed by and enclosure 110. The enclosure 110 may further include a rotatable door 112 so that one may access the storage cavity by opening the door 112. As can be seen in FIG. 1, the storage cavity may include a number of storage racks 115 disposed inside the storage cavity. Thus, inventory items 120 (e.g., bottles of wine) may be stored resting in a prone position in respective positions in the various racks 115 for longer term storage.

The storage appliance 100 further includes a panel 130 within the door 112. The panel may comprise a number of different functional elements. One functional element of the panel comprises a glass structure that is transparent or translucent so that an individual may look through the glass panel 130 into the cavity to see inventory items that may or may not be stored in the enclosed storage cavity. Further, the panel 130 may comprise a touch-sensitive overlay (not shown in FIG. 1) that can detect tactile inputs at specific locations on the panel. Further yet, the panel 130 may include a liquid-crystal display (LCD) overlay (not shown in FIG. 1) for displaying text and images on the panel 130 at specific locations in response to specific tactile or other input. These functional elements of the panel 130 are discussed in greater detail below with respect to FIG. 3.

In this embodiment, the device 100 may be a refrigeration system configured to maintain a temperature inside the storage cavity where the inventory items may be kept. Further embodiments may include additional environment control systems for pressure and humidity. Various components may be powered by a suitable power source such as a common 120 VAC, 60 Hz electric receptacle typically found in homes and businesses. In other embodiments, the various components described below may be embodied in separate but related standalone components configured to interact with each. For example, the same functionality described below may be embodied in a wine cellar system, a walk-in closet or any other chamber or cavity suited to store an inventory of items.

Figure 2:
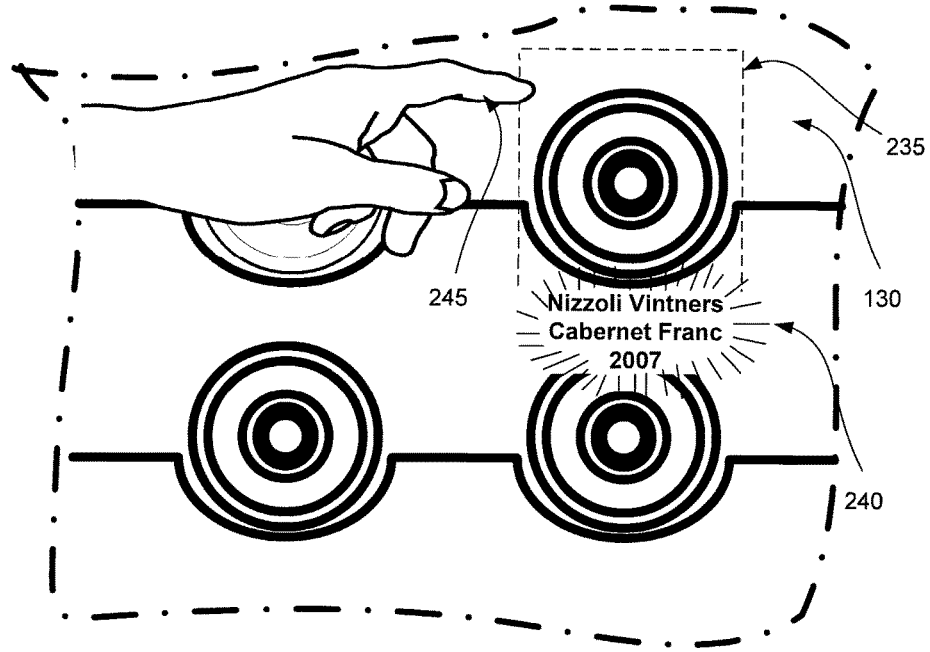
FIG. 2 is a close-up diagram of the front of the storage appliance from FIG. 1 wherein a touch sensitive region is engaged to identify a corresponding bottle of wine according to an embodiment of the subject matter disclosed herein.

FIG. 2 is a close-up diagram of the front of the storage appliance 100 from FIG. 1 wherein a touch sensitive region 235 is engaged to identify a corresponding inventory item according to an embodiment of the subject matter disclosed herein. FIG. 2 shows a portion of the panel 130 of the storage appliance 100. One can see through the panel 130 where underlying inventory items (e.g., bottles of wine) may be stored. Further, in this close-up view, various regions 235 of the panel 130 may be adjacent to underlying storage locations for inventory items. That is, when the door is closed, the glass panel is then set close to the underlying storage locations in the cavity of the storage appliance. Thus, respective regions 235 of the panel 130 are then disposed adjacent to respective storage locations. Such regions may be defined somewhat loosely and as shown in FIG. 2, the region 235 is shown as a rectangle corresponding to one storage location.

An individual may engage a specific region 235 of the panel 130 using tactile input or tactile contact to trigger display of identification information. In FIG. 2, such a tactile input may be initiated using a pointer finger 245 (or any other manner of initiating a tactile input such as a stylus or the like). The panel may then detect the tactile input within the specific region and cause display of identification information 240 on the panel 130 near the region 235. The identification information displayed may indicate specific information about an inventory item stored in the corresponding respective storage location. That is, a person may touch the panel 130 near a bottle of wine stored in the storage chamber and then see information about the bottle of wine displayed right on the panel 130 near the bottle.

In this embodiment, the displayed identification information 240 may include a number of different data points about the underlying inventory item. In the case of a bottle of wine, the displayed information includes a name of a winery (e.g., "Nizzoli Vintners"), a grape varietal (e.g., "Cabernet Franc"), and a vintage (e.g., "2007"). Additional information may also be displayed including but not limited to wine name, reviewer notes, personal notes, wine score, date of purchase, drinkability dates, additional grape varietals for blends, and owner's name. As will be discussed next, a number of different mechanisms may be used to detect the tactile input as well as to display the identification information.

Figure 3:
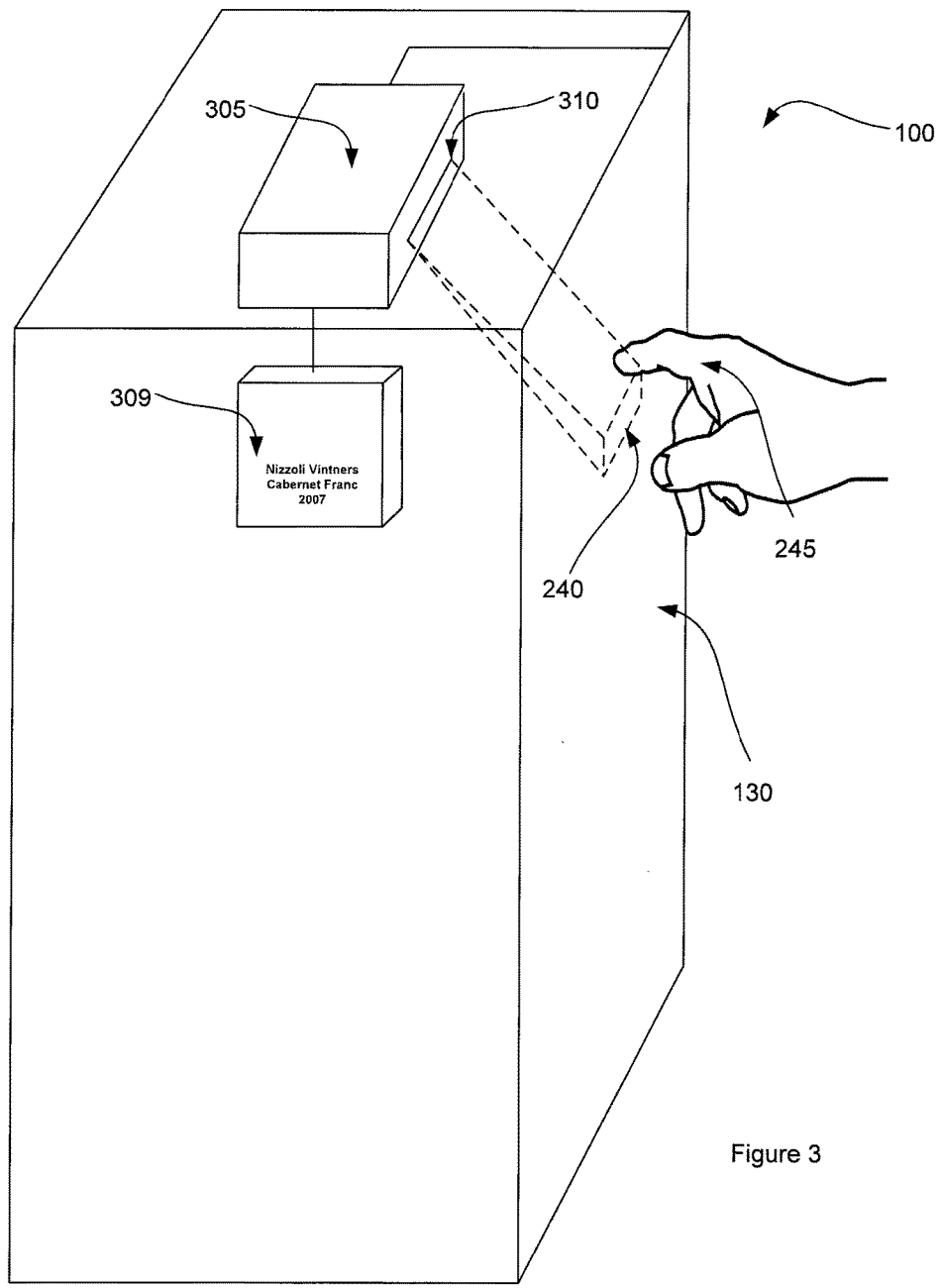
FIG. 3 shows a transparent view of the storage appliance from FIG. 1 wherein a display device is displaying data on the front panel of the storage appliance according to an embodiment of the subject matter disclosed herein.

FIG. 3 shows a transparent view of the storage appliance 100 from FIG. 1 wherein a projection device 310 is displaying identification information 240 on the front panel 130 of the storage appliance 100 according to an embodiment of the subject matter disclosed herein. In this embodiment, the projection device 310 may be part of a controller 305 configured to control a number of different functions of the storage appliance 100. Various functions of the controller 305 are discussed in greater detail below with respect to FIG. 5.

The controller 305 may sense tactile inputs at the panel 130 as the controller 305 is communicatively coupled to the panel via connection 306. Such detection may be accomplished using a number of different components and mechanisms. For example, in one embodiment, the panel 130 includes a touch-sensitive overlay using capacitive detection to determine a location of a touch from an input object (e.g., a pointer finger 245). In another embodiment, the detection mechanism includes components for projecting horizontal and vertical light planes to detect interruptions at specific coordinates on the panel 130. Using such coordinate-identification mechanism, the controller 305 may detect tactile input in specific regions whereby a specific corresponding display of identification information is triggered on the panel 130.

Once a specific region is identified corresponding to the tactile input, the controller 305 may access a local memory to retrieve the corresponding identification information. The retrieved identification information may be displayed on the panel adjacent to the identified region. In one embodiment, the display may be realized using a projection device 310 that projects an image 240 of the identification information on the panel 130 near the region engaged by the tactile input. In another embodiment, the panel may further include an LCD overlay that is transparent such that one can still see through the panel 130, but is configured to render the identification information near the region engaged by the tactile input. In yet another embodiment, the panel may further include an LED overlay that is also transparent such that one can still see through the panel 130, and again is configured to render the identification information near the region engaged by the tactile input.

The controller 305 may be communicatively coupled to a local user interface 309 (or more than one) that may receive control inputs from a user or may display the identification information corresponding to the region engaged by the tactile input. Further yet, the storage appliance 100 may include several small display devices mounted to the inside of the transparent door 130 at respective tactile regions. In this manner, an image 240 on a respective display device mounted in or on the storage appliance 100. In yet another embodiment, an audio device may be used to play an audio file to identify the respective information corresponding to an engaged region. This may provide blind people the ability to switch between "visual" to "audible" so that one could touch the door 130 and have the information 240 of the nearest bottle 'read' to them though a rendered audio file.

FIG. 4 is a system for managing inventory showing the storage appliance of FIG. 1 communicatively coupled to a smart device 400 according to an embodiment of the subject matter disclosed herein. As shown here, the inventory storage appliance 100 may be communicatively coupled to a remote computing device 400 (e.g., a smart phone) such that the identification information 240 corresponding to the tactile input 245 is then communicated to and displayed on the remote computing device 400.

The remote computing device 400 may further include an application executing thereon that features a number of additional functions usable by a user of the remote device 400. In one embodiment, the remote computing device 400 and the storage device 100 may be linked via a wireless communication protocol such as Wi-Fi or BlueTooth™. Using such a wireless communication link, the application may also be used to load identification data into a local memory as inventory is placed in the storage device 100. Further yet, a user of the remote computing device 400 may make tasting notes for wine or store additional information about various inventory items.

An additional feature available to users of a linked remote computing device 400 is the ability to search through a locally stored list of the inventory that may be stored in the storage device 100 and to select one item. Upon selection, the location of the item in the storage device 100 may then have a corresponding adjacent region illuminate so as to assist the user in identifying where the selected item actually is. Additional features may include alerts regarding empty spaces or removed inventory as well as alerts related to "drink-by" dates for each inventory item. Further yet, additional embodiments may include an automatic inventory update between the storage appliance 100 and the computing device 400 via a wireless communications channel. Additionally, an alert, set by a user, may be indicative of low inventory or out of inventory of a certain inventory item, with an option to 're-order' via an application that is configured to provide a direct link to a merchant with a preexisting relationship with the user. The computing device 400 may have a real-time communications link to the storage appliance 100 to allow a user to check on inventory on 400 while at a winery, tasting room, or any other place or check tasting notes. Additional features of a real-time communications link include being able to engage a voice-activated assistant application, e.g., speaking, "Computer—find 2012 Browne Cabernet" to identify and locate a specific inventory item in the storage appliance 100.

FIG. 5 is a block diagram of a system 500 for managing inventory according to an embodiment of the subject matter disclosed herein. The system includes the controller 305 of FIG. 3 in addition to components for realizing functionality as discussed above for an inventory management storage appliance 100. In this embodiment, the controller 305 includes a microprocessor 510 configured to execute computer instructions to accomplish tasks corresponding to the inventory management system. The processor 510 may be coupled to a memory 515 configured to store programs and data, including the identification information (240 of FIG. 2) that may be displayed when triggered. Further, the processor 510 may be coupled to a communication module 520 suited to facilitate communication with remote computing devices (not shown in FIG. 5) via wired or wireless communication.

The processor 510 may also be coupled to an environmental control module 552 configured to facilitate maintaining temperature, pressure and/or humidity in an inner chamber of the inventory storage appliance 100. The processor 510 may be coupled to the panel 130 in one or more ways including through a display interface 530 such that images and text may be rendered on a display overlay 550 that is part of the panel 130. Further, the processor 510 may be coupled to a touch panel overlay 551 via a touch panel interface 540 such that tactile inputs may be detected and received by the processor 510. Such environmental control may also be controlled via the communicatively-coupled application executing on the mobile computing device 400 of FIG. 4.

Figure 6:
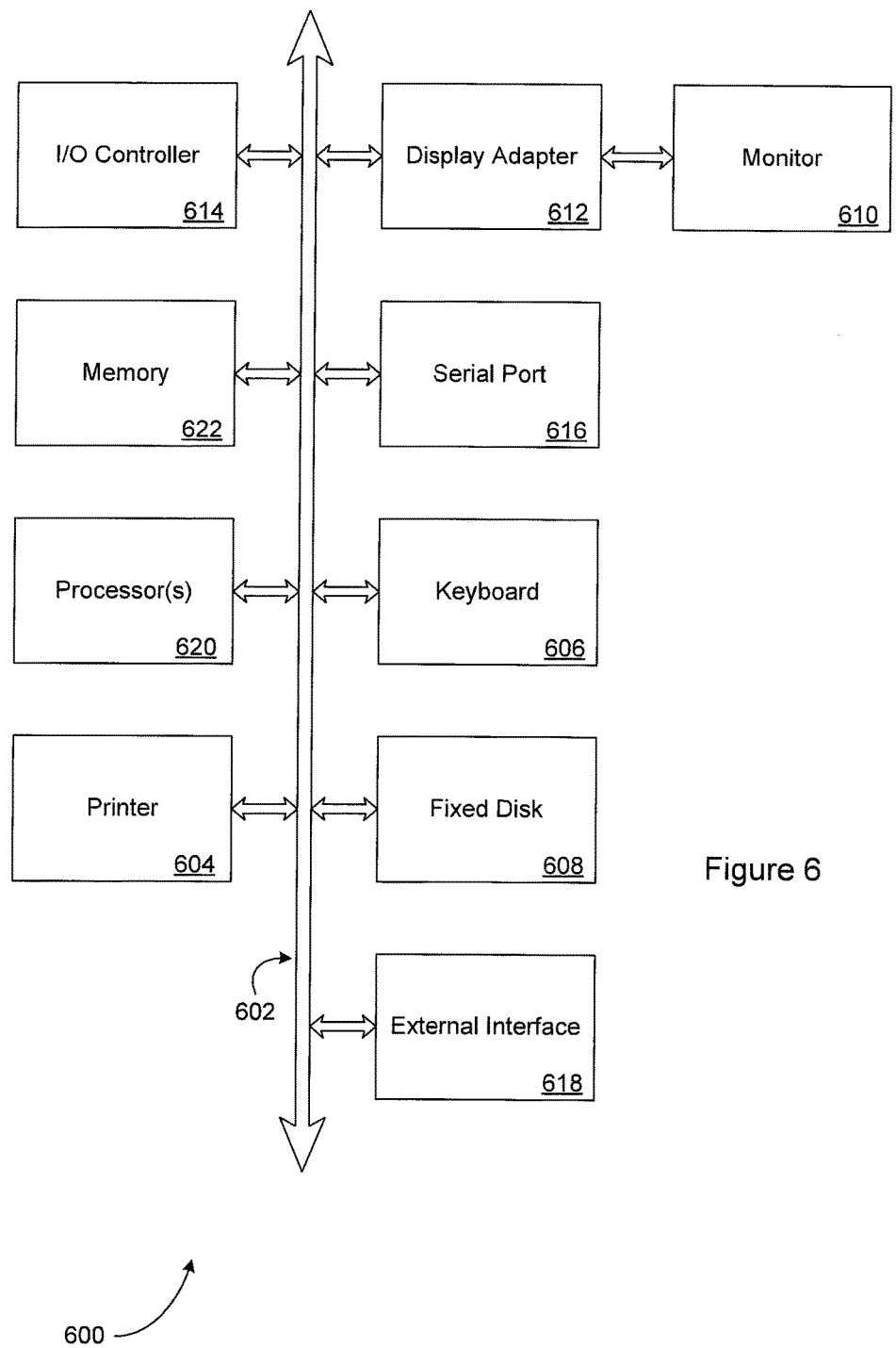
FIG. 6 is a representative computing device for use with the inventory management system of FIG. 5 according to an embodiment of the subject matter disclosed herein.

FIG. 6 is a representative computing device for use with the inventory management system of FIG. 5 according to an embodiment of the subject matter disclosed herein. In accordance with one embodiment, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 6 is a diagram illustrating elements or components that may be present in a computer device or system 600 configured to implement a method, process, function, or operation in accordance with an embodiment. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

Figure 7:
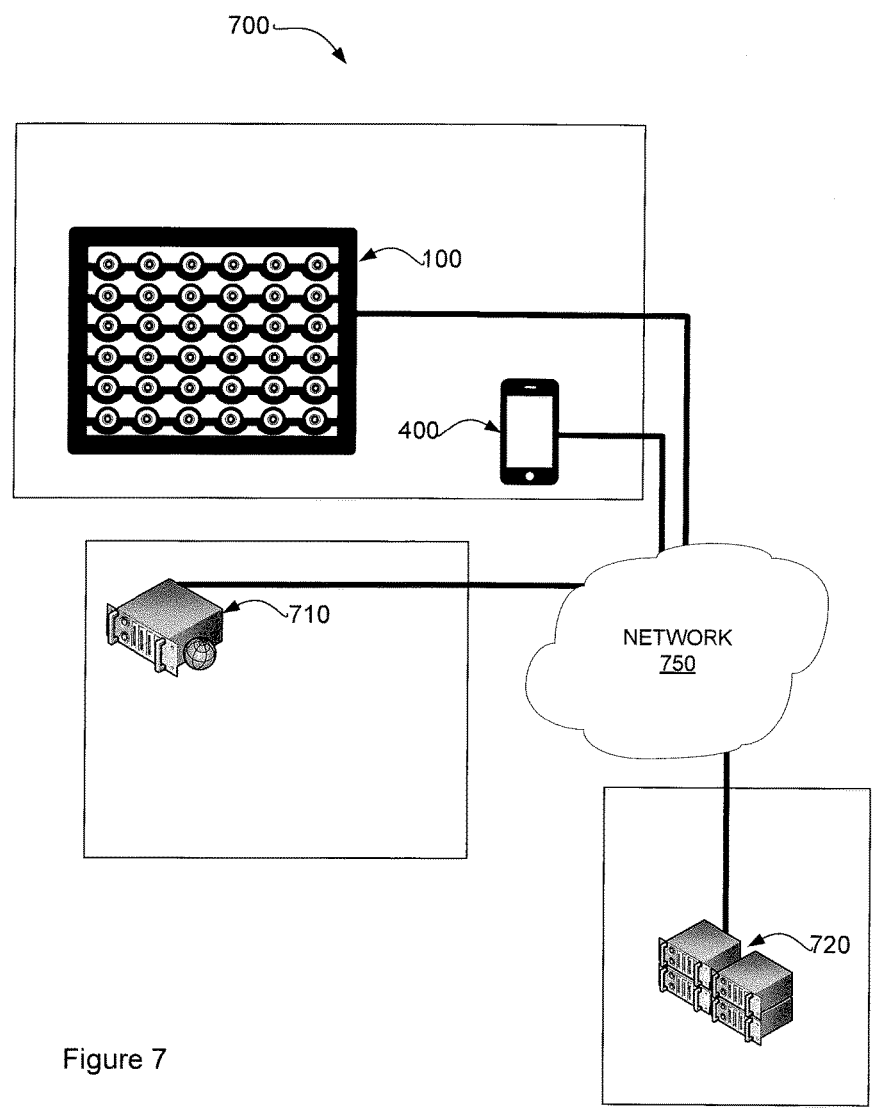
FIG. 7 is a representative computer network for use with the inventory management system of FIG. 5 according to an embodiment of the subject matter disclosed herein.

FIG. 7 is a representative computer network 700 for use with the inventory management system of FIG. 5 according to an embodiment of the subject matter disclosed herein. This distributed computing system 700 may include the inventory management appliance 100 as discussed with respect to FIG. 1 as well as the mobile computing device 400 as discussed above with respect to FIG. 4. Both the mobile computing device 400 and the inventory management appliance may be communicatively coupled to a computer network 750, such as the internet. In this manner, both local devices may communicate with remotely coupled computing devices.

One such remotely coupled device may be a wine maker server computer 720 wherein information about one or more particular wines may be downloaded for use in an application executing on the mobile computing device 400. In a further embodiment, a second remotely coupled computing device may be a personal computer owned and operated by the owner of the inventory management system. In this manner, a more robust graphic user interface (GUI) may be provided in a desktop application for managing an inventory. Such additional features may include establishing inventory triggers that automatically order more wine when a threshold of spaces are detected as empty. Further, tasting notes and winemaker notes may be stored at the remote desktop application as well.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A device, comprising:
an enclosure surrounding a storage cavity configured to store an inventory of items, the storage having a plurality of positions for each item in the inventory to be stored in a respective unique position in the storage cavity;

a panel disposed on a door that is rotatably coupled to the enclosure, the panel configured to sense one or more tactile inputs in one or more regions, each of the one or more regions disposed on the panel adjacent to one of the respective unique positions for storing the respective item; and a display device disposed in the enclosure and configured to display identification information about the respective stored item in response to a detected tactile input at the respective region.

2. The device of claim 1, further comprising an environment control system disposed in the enclosure and configured to maintain a temperature within the enclosure.

3. The device of claim 1, wherein the front panel further comprises translucent glass.

4. The device of claim 1, wherein the front panel further comprises a touch-sensitive overlay configured to detect a position of a tactile input on the panel.

5. The device of claim 1, wherein the display device further comprises a projection device configured to project text and images onto the panel.

6. The device of claim 1, wherein the display device further comprises a digital display screen overlaying the panel and configured to control a plurality of pixels to display images on the panel.

7. The device of claim 1, wherein the storage cavity further comprises racks suited to store bottles in rows and columns.

8. The device of claim 1, further comprising a communication module configured to be communicatively coupled to a remote computing device such that the displayed identification information is transmitted to the remote computing device.

9. An inventory management system, comprising:

a computing device having a processor disposed therein and configured to execute computer instructions;

an enclosure surrounding a storage cavity configured to store an inventory of items, the storage cavity having a plurality of positions for each item in the inventory to be stored in a respective unique position in the storage cavity;

a panel disposed on a door that is rotatably coupled to the enclosure, the panel configured to sense one or more tactile inputs in one or more regions, each of the one or more regions disposed on the panel adjacent to one of the respective unique positions for storing the respective item; and a display device communicatively coupled to computing device and configured to display identification information about a respective stored item in response to a detected tactile input at the respective region.

10. The inventory management system of claim 9, wherein the storage cavity comprises a refrigerator.

11. The inventory management system of claim 9, wherein the storage cavity comprises a cellar.

12. The inventory management system of claim 9, wherein the inventory comprises a wine collection.

13. The inventory management system of claim 9, wherein the identification information comprises maker, year, and varietal.

14. The inventory management system of claim 9, wherein the computing device comprises a mobile computing device configured to execute an inventory management application programmed to store additional information including image, tasting notes, reviews, and scores.

15. The inventory management system of claim 9, further comprising an environment monitoring and control subsystem configured to control temperature, pressure and humidity in the cavity.

16. A method, comprising:

storing a plurality of items in a storage device having a panel covering a storage cavity, the storage cavity having a plurality of positions for each item in the inventory to be stored uniquely adjacent to a respective region of the panel;

detecting a tactile input at one of the respective regions; and displaying identification information on the panel corresponding to the item stored adjacent to the respective region that detected the tactile input.

17. The method of claim 16, further comprising transmitting the identification information to a remote computing device communicatively coupled to the storage device.

18. The method of claim 16, further comprising:

detecting a second tactile input in a second one of the respective regions; and displaying identification information on the panel corresponding to the item stored adjacent to the second respective region that detected the second tactile input.

19. The method of claim 16, further comprising receiving:

a data transmission with the identification information corresponding to each respective region from a remote computer; and storing the received identification information in a memory disposed in the storage device.

\* \* \* \* \*